United States Patent
Khandhar et al.

(10) Patent No.: US 11,965,927 B2
(45) Date of Patent: Apr. 23, 2024

(54) SYSTEMS AND METHODS OF TESTING ADVERSE DEVICE CONDITIONS

(71) Applicant: Apple Inc., Cupertino, CA (US)

(72) Inventors: Jay Mayur Khandhar, Milpitas, CA (US); Karen Eckert, San Jose, CA (US); Cyril De La Cropte De Chanterac, San Francisco, CA (US); John Ananny, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 757 days.

(21) Appl. No.: 16/562,350

(22) Filed: Sep. 5, 2019

(65) Prior Publication Data

US 2020/0379034 A1    Dec. 3, 2020

Related U.S. Application Data

(60) Provisional application No. 62/855,892, filed on May 31, 2019.

(51) Int. Cl.
*G06F 30/20*    (2020.01)
*G01R 31/28*    (2006.01)
*G01R 31/3183*    (2006.01)
*G06F 119/08*    (2020.01)

(52) U.S. Cl.
CPC .  *G01R 31/2874* (2013.01); *G01R 31/318357* (2013.01); *G06F 30/20* (2020.01); *G06F 2119/08* (2020.01)

(58) Field of Classification Search
CPC ...... G06F 1/206; G06F 30/20; G06F 2119/08; G06F 30/30; G06F 9/4893; G01R 31/2874; G01R 31/318357
See application file for complete search history.

(56) References Cited

U.S. PATENT DOCUMENTS

| | | | |
|---|---|---|---|
| 7,103,495 B2 | 9/2006 | Kiryu | |
| 7,689,887 B2 | 3/2010 | Gorman et al. | |
| 8,452,463 B2 | 5/2013 | Cox et al. | |
| 8,605,613 B2 | 12/2013 | Zazula et al. | |
| 9,946,560 B2 | 4/2018 | Hill | |
| 10,215,800 B2* | 2/2019 | Dasnurkar | G06F 1/3206 |
| 2006/0116857 A1* | 6/2006 | Sevic | G06F 30/367 |
| | | | 703/13 |

(Continued)

*Primary Examiner* — Kibrom K Gebresilassie
(74) *Attorney, Agent, or Firm* — Kubota & Basol LLP

(57) ABSTRACT

Thermal conditions can be simulated for an electronic device. Application developers may want to test how applications perform under various thermal conditions on a device that includes thermal management. The application developers can use the tests to determine whether the application should take proactive measures to maintain application performance, and which proactive measures should be taken. For example, an application can reduce its use of resources to ensure that an application maintains a desired quality of user experience (and at a minimum remains responsive) under adverse thermal conditions. Creating adverse conditions can be difficult to replicate, costly to implement, and can potential cause damage to the electronic device being tested. In some examples, simulating thermal conditions can be used instead of placing the device in real-world adverse conditions to improve the testing process for developers.

18 Claims, 8 Drawing Sheets

(56) References Cited

U.S. PATENT DOCUMENTS

| | | | |
|---|---|---|---|
| 2006/0290366 A1* | 12/2006 | Kon | G01R 31/2874 324/750.06 |
| 2008/0066022 A1* | 3/2008 | Chandra | G06F 30/36 716/111 |
| 2009/0213083 A1 | 8/2009 | Dicker et al. | |
| 2011/0301778 A1* | 12/2011 | Liang | G06F 1/206 700/299 |
| 2012/0209448 A1* | 8/2012 | Brower | G06F 1/206 700/299 |
| 2012/0311357 A1* | 12/2012 | Andrews | G06F 1/324 713/320 |
| 2014/0196013 A1 | 7/2014 | Orr et al. | |
| 2015/0043156 A1* | 2/2015 | Jain | H04M 1/7246 361/679.46 |
| 2015/0204941 A1 | 7/2015 | Schneider et al. | |
| 2015/0347330 A1* | 12/2015 | Vaishampayan | G06F 13/102 710/60 |
| 2016/0056902 A1* | 2/2016 | Eremenko | H04B 17/16 455/67.11 |
| 2016/0246346 A1* | 8/2016 | Sugumar | G06F 1/3243 |
| 2017/0357568 A1 | 12/2017 | Hughes et al. | |
| 2018/0340974 A1* | 11/2018 | Chen | G01R 31/2877 |
| 2019/0086468 A1* | 3/2019 | Yoshino | G01R 31/2834 |
| 2019/0114212 A1* | 4/2019 | Gwin | G06F 1/3206 |
| 2019/0318264 A1* | 10/2019 | Bian | G06N 20/00 |

* cited by examiner

| | |
|---|---|
| APPLICATIONS (CONTINUED) | 236 |
| CALENDAR MODULE | 248 |
| WIDGET MODULES | 249 |
|     WEATHER WIDGET(S) | 249-1 |
|     STOCKS WIDGET | 249-2 |
|     CALCULATOR WIDGET | 249-3 |
|     ALARM CLOCK WIDGET | 249-4 |
|     DICTIONARY WIDGET | 249-5 |
|     ⋮ | |
|     USER-CREATED WIDGET(S) | 249-6 |
| WIDGET CREATOR MODULE | 250 |
| SEARCH MODULE | 251 |
| ONLINE VIDEO MODULE | 255 |
| ⋮ | |
| DEVICE/GLOBAL INTERNAL STATE | 257 |

*FIG. 2B*

SYSTEMS AND METHODS OF TESTING ADVERSE DEVICE CONDITIONS

CROSS REFERENCE TO RELATED APPLICATIONS

This application claims the benefit under 35 U.S.C. 119(e) of U.S. Provisional Patent Application No. 62/855,892, filed May 31, 2019, the content of which is incorporated herein by reference in its entirety for all purposes.

FIELD OF THE DISCLOSURE

This relates generally to systems and methods of testing electronic devices under adverse conditions, and more particularly to simulating thermal conditions at an electronic device.

BACKGROUND

Some electronic devices include a closed-loop thermal management system to manage the thermal behavior of the electronic device so as to avoid thermal issues that may damage the device or may cause discomfort to its user. For example, an electronic device may overheat and/or cause failure of one or more components under certain adverse thermal conditions (e.g., while using a resource intensive videogame application for an extended period of time in hot weather). The thermal management system can include software (running in the background of the computing system) that gathers temperature data from various temperature sensors of the electronic device and data regarding the current power consumption levels in the electronic device. The thermal management system can then process these data as inputs using stored algorithms in order to make decisions on whether or not to change any one or more of several power consumption or activity levels in the system that can cause heating of the electronic device. For instance, the algorithm may indicate that, based on the current input data, that one or more proactive measures should be taken in order avoid a potential thermal issue. The proactive measures may include throttling of a particularly power-hungry component such as an applications processor (e.g., reducing a clock frequency or reducing power supply voltage), activating a cooling fan, and limiting the maximum output power of an audio or radiofrequency (RF) power amplifier or a light source. When temperatures cool (e.g., as a result of the proactive measures), the thermal management system can reverse one or more of the proactive measures to boost performance. The proactive measures can also impact the performance of applications running on the electronic device.

SUMMARY

This relates to simulating thermal conditions for an electronic device. Application developers may want to test how applications perform under various thermal conditions on a device that includes thermal management. The application developers can use the tests to determine whether the application should take proactive measures to maintain application performance, and which proactive measures should be taken. For example, an application can reduce its use of resources to ensure that an application maintains a desired quality of user experience (and at a minimum remains responsive) under adverse thermal conditions. Creating adverse conditions can be difficult to replicate, costly to implement, and can potential cause damage to the electronic device being tested. In some examples, simulating thermal conditions can be used instead of placing the device in real-world adverse conditions to improve the testing process for developers.

BRIEF DESCRIPTION OF THE DRAWINGS

FIGS. 2A-2B illustrate a block diagram of an example portable multifunction device with touch-sensitive display system according to some examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to simulating thermal conditions for an electronic device. Application developers may want to test how applications perform under various thermal conditions on a device that includes thermal management. The application developers can use the tests to determine whether the application should take proactive measures to maintain application performance, and which proactive measures should be taken. For example, an application can reduce its use of resources to ensure that an application maintains a desired quality of user experience (and at a minimum remains responsive) under adverse thermal conditions. Creating adverse conditions can be difficult to replicate, costly to implement, and can potential cause damage to the electronic device being tested. In some examples, simulating thermal conditions can be used instead of placing the device in real-world adverse conditions to improve the testing process for developers.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
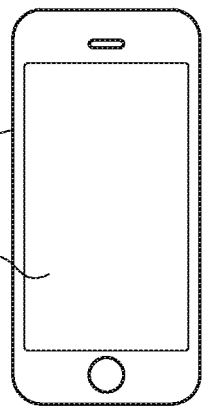
FIGS. 1A-1E illustrate example electronic devices that can be tested using simulated thermal conditions according to examples of the disclosure.
Figure 1B:
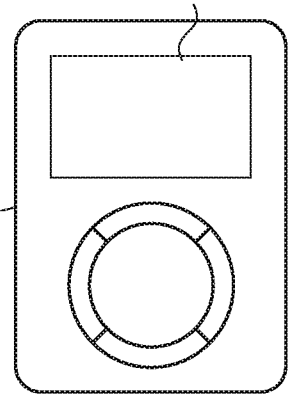
Figure 1C:
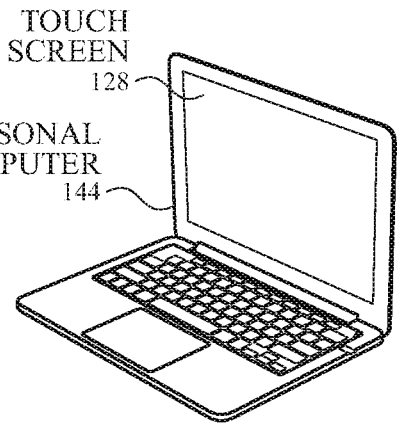
Figure 1D:
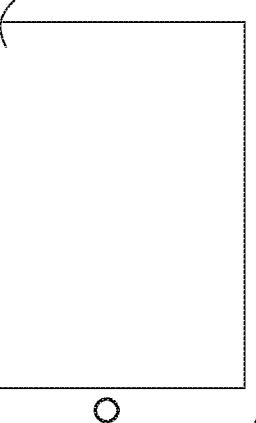
Figure 1E:
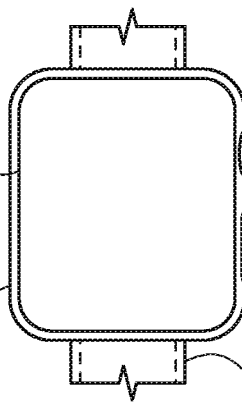

FIGS. 1A-1E illustrate example electronic devices that can be tested using simulated thermal conditions according to examples of the disclosure. FIG. 1A illustrates an example mobile telephone 136 that includes a touch screen 124 (e.g., the iPhone® from Apple Inc. of Cupertino, Calif.) that can be tested using simulated thermal conditions according to examples of the disclosure. FIG. 1B illustrates an example digital media player 140 (e.g., iPod Touch® from Apple Inc.) that includes a touch screen 126 that can be tested using simulated thermal conditions according to examples of the disclosure. FIG. 1C illustrates an example personal computer 144 (e.g., iMac® MacBook® from Apple Inc.) that includes a touch screen 128 that can be tested using simulated thermal conditions according to examples of the disclosure. FIG. 1D illustrates an example tablet computing device 148 (iPad® from Apple Inc.) that includes a touch screen 130 that can be tested using simulated thermal conditions according to examples of the disclosure. FIG. 1E illustrates an example wearable device 150 (e.g., Apple Watch® from Apple Inc.) that includes a touch screen 132 and can be attached to a user using a strap 152 and that can be tested using simulated thermal conditions according to examples of the disclosure. It is understood that testing using simulated thermal conditions according to examples of the disclosure can be implemented in other devices as well, including any mobile or non-mobile, wearable or non-wearable computing device. Additionally it should be understood that although the electronic devices of FIGS. 1A-1E include touch screens, testing using simulated thermal conditions can be implemented on electronic devices without a touch screen or a display. Additionally, the electronic devices may include one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the electronic device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 2A:
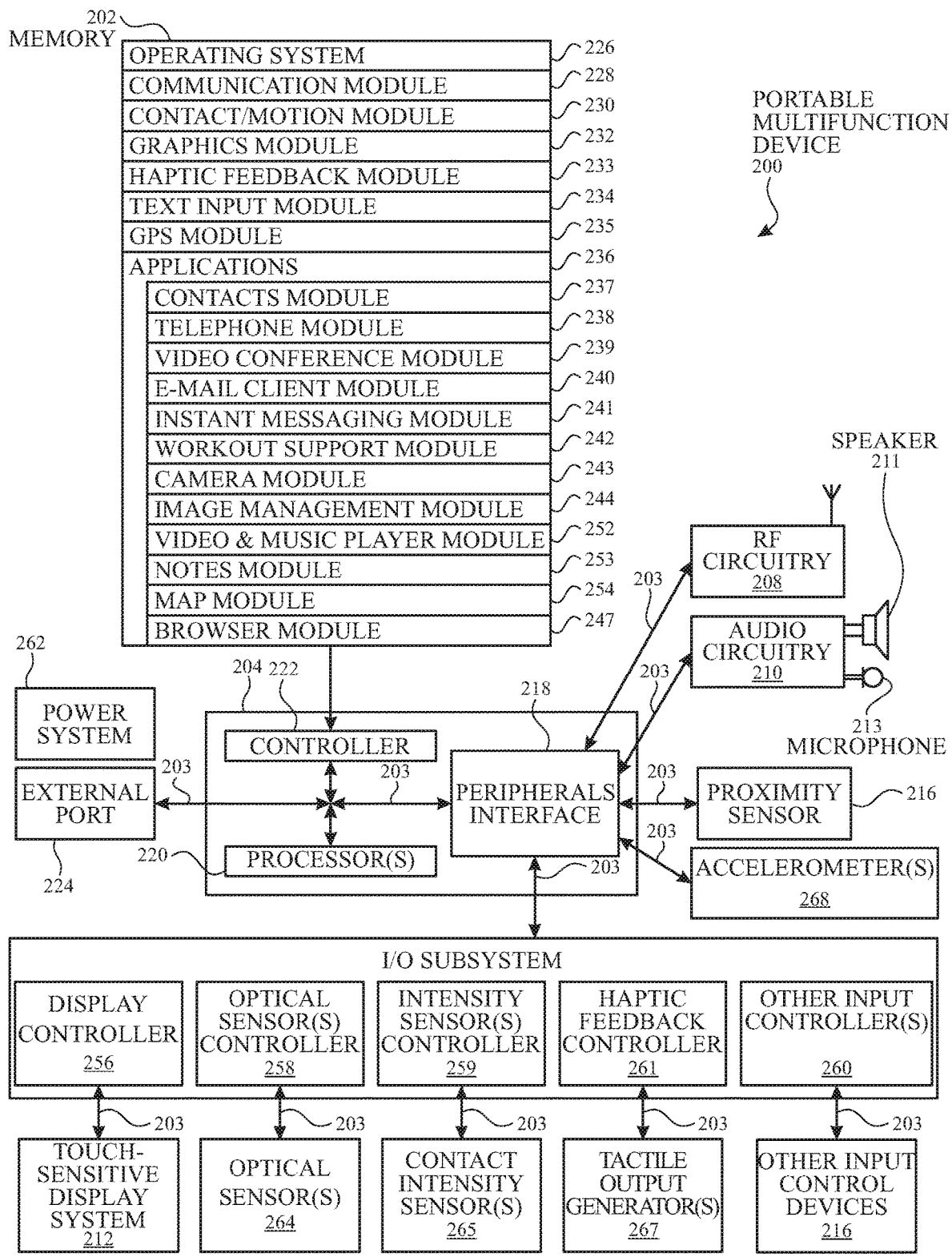

FIGS. 2A-2B illustrate a block diagram of an example portable multifunction device 200 with touch-sensitive display system 212 according to some examples of the disclosure. Touch-sensitive display 212 may sometimes be called a "touch screen" for convenience and is sometimes known as or called a "touch-sensitive display system." Device 200 includes memory 202 (which optionally includes one or more computer-readable storage mediums), memory controller 222, one or more processing units (e.g., CPUs) 220, peripherals interface 218, radio frequency (RF) circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity (e.g., force or pressure) of contacts on device 200 (e.g., a touch-sensitive surface such as touch-sensitive display system 212 of device 200). Device 200 optionally includes one or more tactile output generators 267 (also referred to as haptic devices) for generating tactile outputs on device 200 (e.g., generating tactile outputs on a touch-sensitive surface such as touch-sensitive display system 212 of device 200). These components optionally communicate over one or more communication buses or signal lines 203.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIGS. 2A-2B are implemented in hardware, software, or a combination of both hardware and software, including one or more signal processing and/or application-specific integrated circuits.

Memory 202 optionally includes high-speed random access memory (e.g., one or more DRAM, SRAM, DDR RAM, or other random access solid state memory devices) and optionally also includes non-volatile memory, such as one or more magnetic disk storage devices, optical disk storage devices, flash memory devices, or other non-volatile solid-state memory devices. Memory controller 222 optionally controls access to memory 202 by other components of device 200.

Peripherals interface 218 can be used to couple input and output peripherals of the device to CPU 220 and memory 202. The one or more processors 220 run or execute various software programs and/or sets of instructions stored in memory 202 to perform various functions for device 200 and to process data. In some examples, peripherals interface 218, CPU 220, and memory controller 222 are, optionally, implemented on a single chip, such as chip 204. In some other examples, they are, optionally, implemented on separate chips.

RF circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data is, optionally, retrieved from and/or transmitted to memory 202 and/or RF circuitry 208 by peripherals interface 218. In some examples, audio circuitry 210 also includes a headset jack. The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller (or touchscreen controller) 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate examples, input controller(s) 260 are, optionally, coupled to any (or none) of the following: a keyboard, an infrared port, a USB port, and a pointer device such as a mouse. The one or more buttons optionally include an up/down button for volume control of speaker 211 and/or microphone 213. The one or more buttons optionally include a push button.

A quick press of the push button optionally disengages a lock of touch screen 212 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button optionally turns power to device 200 on or off or optionally begins a process to turn the power to device 200 on or off. The functionality of one or more of the buttons are, optionally, user-customizable. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output optionally includes graphics, text, icons, video, and any combination thereof (collectively termed "graphics"). In some examples, some or all of the visual output optionally corresponds to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary example, a point of contact between touch screen 212 and the user corresponds to a finger of the user.

Touch screen 212 optionally uses LCD (liquid crystal display) technology, LPD (light emitting polymer display) technology, LED (light emitting diode) technology, OLED (organic light emitting diode) technology, although other display technologies are used in other examples. Touch screen 212 and display controller 256 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary example, projected mutual capacitance sensing technology is used, such as that found in the iPhone® and iPod Touch® from Apple Inc.

A touch-sensitive display in some examples of touch screen 212 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some examples of touch screen 212 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 optionally has a video resolution in excess of 100 dpi. In some examples, the touch screen has a video resolution of approximately 160 dpi. The user optionally makes contact with touch screen 212 using any suitable object or appendage, such as a stylus, a finger, and so forth. In some examples, the user interface is designed to work primarily with finger-based contacts and gestures, which can be less precise than stylus-based input due to the larger area of contact of a finger on the touch screen. In some examples, the device translates the rough finger-based input into a precise pointer/cursor position or command for performing the actions desired by the user.

In some examples, in addition to the touch screen, device 200 optionally includes a touchpad (not shown) for activating or deactivating particular functions. In some examples, the touchpad is a touch-sensitive area of the device that, unlike the touch screen, does not display visual output. The touchpad is, optionally, a touch-sensitive surface that is separate from touch screen 212 or an extension of the touch-sensitive surface formed by the touch screen.

Device 200 also includes power system 262 for powering the various components. Power system 262 optionally includes a power management system (e.g., power management circuit 302), one or more power sources (e.g., battery 332), alternating current (AC)), a recharging system (e.g., charger 334), a power failure detection circuit, a power converter or inverter, a power status indicator (e.g., a light-emitting diode (LED)) and any other components associated with the generation, management and distribution of power in portable devices. Thermal management described herein can be implemented as part of power system 262.

Device 200 optionally also includes one or more optical sensors 264. FIGS. 2A-2B show an optical sensor coupled to optical sensor controller 258 in I/O subsystem 206. Optical sensor 264 optionally includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 optionally captures still images or video. In some examples, an optical sensor is located on the back of device 200, opposite touch screen display 212 on the front of the device so that the touch screen display is enabled for use as a viewfinder for still and/or video image acquisition. In some examples, an optical sensor is located on the front of the device so that the user's image is, optionally, obtained for video conferencing while the user views the other video conference participants on the touch screen display. In some examples, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIGS. 2A-2B show a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some examples, at least one contact intensity sensor is collocated with, or proximate to, a touch-sensitive surface (e.g., touch-sensitive display system 212). In some examples, at least one contact intensity sensor is located on the back of device 200, opposite touch screen display 212, which is located on the front of device 200.

Device 200 optionally also includes one or more proximity sensors 266. FIGS. 2A-2B show proximity sensor 266 coupled to peripherals interface 218. Alternately, proximity sensor 266 is, optionally, coupled to input controller 260 in I/O subsystem 206. Proximity sensor 266 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals,"

which are hereby incorporated by reference in their entirety. In some examples, the proximity sensor turns off and disables touch screen 212 when the multifunction device is placed near the user's ear (e.g., when the user is making a phone call).

Device 200 optionally also includes one or more tactile output generators 267. FIGS. 2A-2B show a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some examples, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some examples, at least one tactile output generator sensor is located on the back of device 200, opposite touch screen display 212, which is located on the front of device 200.

Device 200 optionally also includes one or more accelerometers 268. FIGS. 2A-2B show accelerometer 268 coupled to peripherals interface 218. Alternately, accelerometer 268 is, optionally, coupled to an input controller 260 in I/O subsystem 206. Accelerometer 268 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some examples, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

In some examples, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, and applications (or sets of instructions) 236. Furthermore, in some examples, memory 202 stores device/global internal state 257, as shown in FIGS. 2A-2B. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, High-Definition Multimedia Interface (HDMI), etc.) is adapted for coupling directly to other devices or indirectly over a network (e.g., the Internet, wireless LAN, etc.). In some examples, the external port is a multi-pin (e.g., 30-pin) connector that is the same as, or similar to and/or compatible with, the 30-pin connector used on iPod® (trademark of Apple Inc.) devices. In some examples, the external port is a multi-pin (e.g., 8-pin) connector that is the same as, or similar to and/or compatible with the Lightning® (trademark of Apple Inc.) connector.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some examples, contact/motion module 230 and display controller 256 detect contact on a touchpad.

In some examples, contact/motion module 230 uses a set of one or more intensity thresholds to determine whether an operation has been performed by a user (e.g., to determine whether a user has "clicked" on an icon). In some examples, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some examples, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, optionally, a component of graphics module 232, provides soft keyboards for entering text in various applications (e.g., contacts 237, e-mail 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Applications 236 optionally include the following modules (or sets of instructions), or a subset or superset thereof: Contacts module 237 (sometimes called an address book or contact list); Telephone module 238; Video conference module 239; E-mail client module 240; Instant messaging (IM) module 241; Workout support module 242; Camera module 243 for still and/or video images; Image management module 244; Video player module; Music player module; Browser module 247; Calendar module 248; Widget modules 249, which optionally include one or more of: weather widget 249-1, stocks widget 249-2, calculator widget 249-3, alarm clock widget 249-4, dictionary widget 249-5, and other widgets obtained by the user, as well as user-created widgets 249-6; Widget creator module 250 for making user-created widgets 249-6; Search module 251; Video and music player module 252, which merges video player module and music player module; Notes module 253; Map module 254; and/or Online video module 255.

Examples of other applications 236 that are, optionally, stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are, optionally, used to manage an address book or contact list (e.g., stored in application internal state 292 of contacts module 237 in memory 202), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are optionally, used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some examples, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that are, optionally, downloaded and used by a user (e.g., weather widget 249-1, stocks widget 249-2, calculator widget 249-3, alarm clock widget 249-4, and dictionary widget 249-5) or created by the user (e.g., user-created widget 249-6). In some examples, a widget includes an HTML (Hypertext Markup Language) file, a CSS (Cascading Style Sheets) file, and a JavaScript file. In some examples, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are, optionally, used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some examples, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are, optionally, used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some examples, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various examples. For example, video player module is, optionally, combined with music player module into a single module (e.g., video and music player module 252). In some examples, memory 202 optionally stores a subset of the modules and data structures identified above. Furthermore, memory 202 optionally stores additional modules and data structures not described above.

In some examples, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is, optionally, reduced.

The predefined set of functions that are performed exclusively through a touch screen and/or a touchpad optionally include navigation between user interfaces. In some examples, the touchpad, when touched by the user, navigates device 200 to a main, home, or root menu from any user interface that is displayed on device 200. In such examples, a "menu button" is implemented using a touchpad. In some other examples, the menu button is a physical push button or other physical input control device instead of a touchpad.

As described herein, an electronic device can also include a thermal management system. The thermal management system can operate in different operating modes. In a first operating mode (i.e., a closed-loop mode), the thermal management system can change one or more parameters to change power consumption by (and heating of) the electronic device based on temperature measurements from one or more temperature sensors. As the temperature measurements from the one or more temperature sensors indicate increases in temperatures above various threshold levels, the thermal management system can change one or more of several power consumption or activity levels in the system (e.g., reduce power and/or throttle speed of various components). In response to these changes in one or more of several power consumption or activity levels in the system (and/or in response to other environmental changes), the temperatures measured from the one or more temperature sensors can decrease. As the temperatures decrease below various threshold levels (the same as or different from the thresholds described above), the thermal management system that can change one or more of several power consumption or activity levels in the system (e.g., increasing power and/or speed of various components). In a second operating mode (i.e., an open-loop mode or a simulation mode), the thermal management system can change a power consuming activity limit on the electronic device based on simulated temperature measurements rather than measured temperatures from one or more temperature sensors.

In some examples, to prevent damage to device while operating in the second mode, the temperature measurements of the one or more temperature sensors can continue to be monitored and used to trigger transitions to and/or from the second mode. For example, when the temperature measurements of the one or more temperature sensors depart (e.g., a threshold amount) from the simulated temperature, the thermal management system can pause or terminate the simulation and transition to the first mode of operation. In some examples, when the temperature measurements of the one or more temperature sensors return (e.g., within a threshold amount) to the simulated temperature, the thermal management system can resume the simulation and transition to the second mode of operation.

Figure 3:
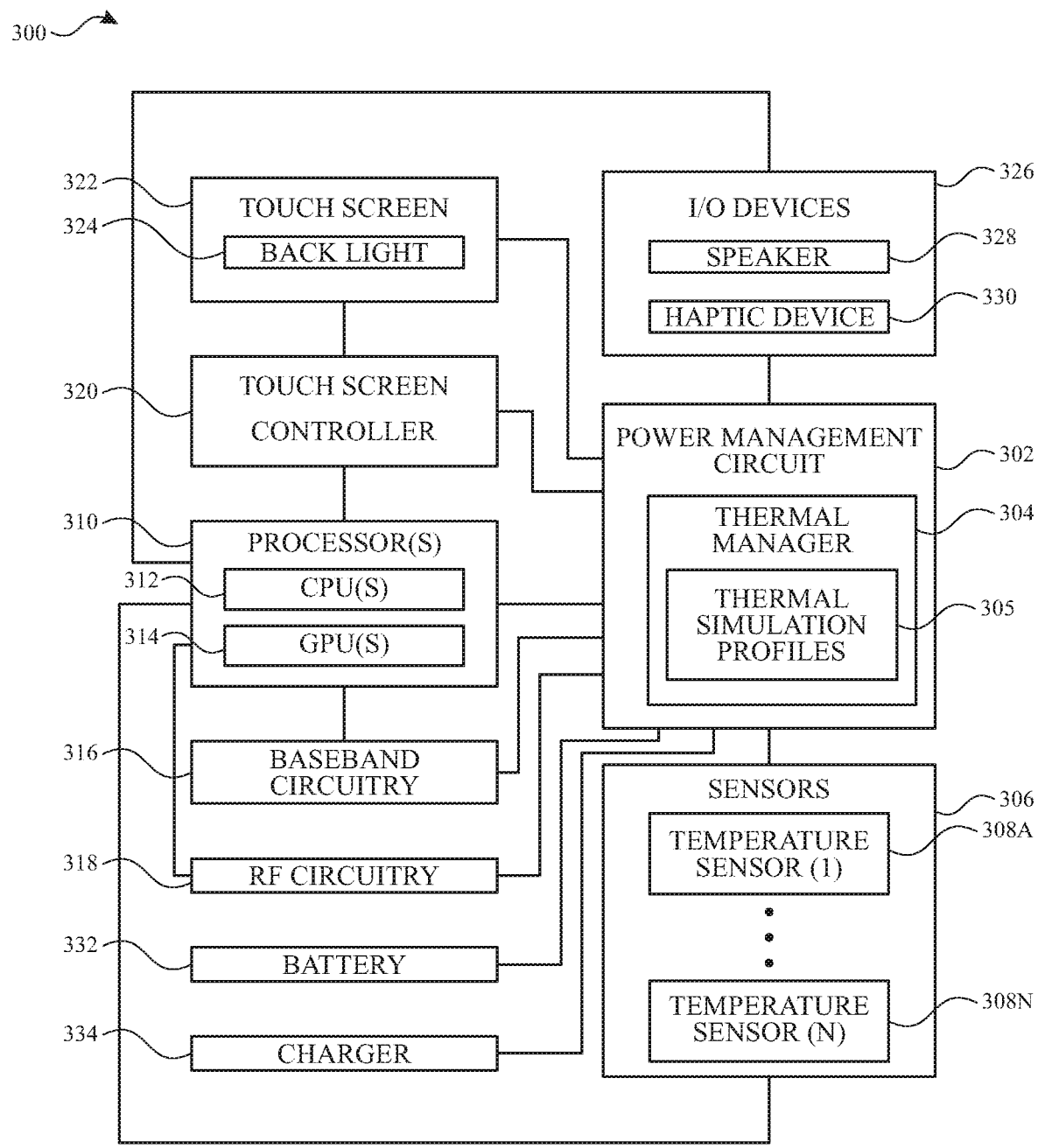
FIG. 3 illustrates a block diagram of an example electronic device including a thermal management system according to some examples of the disclosure.

FIG. 3 illustrates a block diagram of an example electronic device 300 including a thermal management system according to some examples of the disclosure. Electronic device 300 (e.g., corresponding to electronic device 200 and/or one of the electronic devices in FIGS. 1A-1E) can include a power management system 302 (e.g., implemented as part of power system 262) and one or more sensors 306 (e.g., corresponding to proximity sensor 266, accelerometers 268, etc.), including one or more temperature sensors 308A-N. One or more temperature sensors can be used, for example, for some of the thermal management processes described herein. In addition electronic device 300 can include various hardware components that may consume power and/or contribute to heating of electronic device 300. These hardware components can include, but are not limited to, one or more processing circuits 310 (e.g., corresponding to one or more processors 120), optionally including one or more CPUs 312 and one or more graphics processing units (GPUs) 314; one or more communication circuits (e.g., corresponding to RF circuitry 208) including baseband circuitry 316 (e.g., one or more baseband processors) and/or other RF circuitry 318 (e.g., Wi-Fi or Bluetooth radios/processors); a touch screen 322, including a light source such as backlight 324 (or LEDs, OLEDs, etc.), and a touch screen controller 320 (e.g., corresponding to touch-sensitive display system 212 and display controller 256 and/or or other input controllers); one or more additional input/output devices 326, optionally including one or more speakers 328 (e.g., corresponding to speaker 111) and/or one or more haptic feedback devices (e.g., corresponding to tactile output generator(s) 267); and battery 332 and corresponding charger 334 (e.g., a wired or wireless charger circuitry). In addition, some of sensors 306 can be included among the various hardware components that may consume power and/or contribute to heating of electronic device 300.

Power management circuit 302 (also often referred to as a power management unit (PMU)) can be implemented as a programmed processor to perform power management processes including the thermal management processes described herein. In some examples, power management circuit 302 can include analog and digital conversion circuitry (e.g., to measure voltages from the battery or device parameters), memory (e.g., a non-transitory computer-readable storage medium), firmware, software (e.g., stored in memory), analog signal conditioning circuitry and a data communications circuitry (for input and output functions). Power management circuitry 302 can be coupled to the one or more hardware components to receive information from the one or more hardware components (e.g., sensor reading, power readings and/or operating parameters, etc.) and/or to transfer information to the one or more hardware components (e.g., operating constraints to perform thermal management as described herein). In some examples, power management circuitry 302 can be coupled to the one or more hardware components via a communication bus such as serial peripheral interface (SPI) or an I2C bus.

In some examples, the thermal management processes described herein can be performed by a thermal manager 304 (e.g., implemented as part of power management circuit 302). Thermal manager 304 can be a program module (e.g., including a daemon) stored in memory of power management circuit 302 (or in another memory in or separate from power management circuitry 302), which can program the processor of power management circuit 302 to perform the thermal management functions. In some examples, the thermal manager can include one or more thermal simulation profiles 305 (or receive the one or more thermal simulation profiles from a tester device). The thermal simulation profiles can be used to simulate temperature measurements by one or more temperature sensors based on a simulated thermal condition provided from a tester device (e.g., tester device 102).

Figure 4:
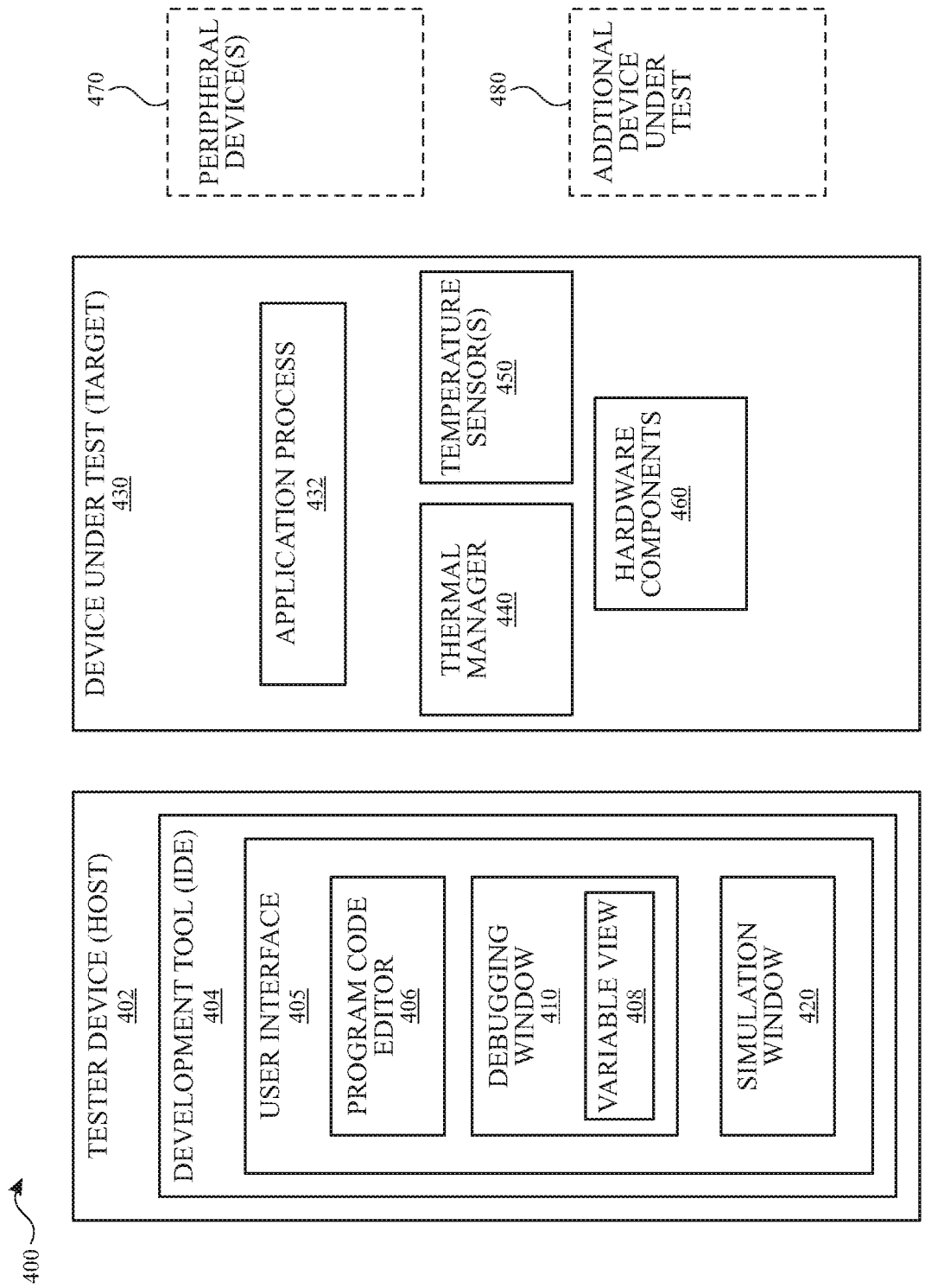
FIG. 4 illustrates an example test configuration including tester device and device under test according to some examples of the disclosure.

FIG. 4 illustrates an example test configuration 400 including tester device 402 and device under test 430 according to some examples of the disclosure. The tester device 402 can be a host computing device (host system), such as a desktop or laptop computer running an operating system (e.g., MacOS or the like). In some examples, tester device 402 can include some or all of the components of an electronic device illustrated in FIGS. 2A & 2B (e.g., memory 202, one or more processors 220, etc.). In some examples, tester device 402 can run a multi-platform software development tool or integrated development environment (IDE) 404. In some examples, IDE 404 can be Xcode® (from Apple Inc.) that provides features to enable software developers to create, run, and debug computer program code on a target device (e.g., one of the devices shown in FIGS. 1A-1E, which may also include some or all of the components illustrated in FIGS. 2A & 2B). The IDE 404 can control an application process 432 that executes on a target device 430. The target device 430 may be running the same or a different operating system from tester device 402. For example, device under test 430 may correspond to mobile telephone 136 or tablet computing device 148 running iOS or wearable device 150 running WatchOS, which may be different than MacOS running on tester device 402. In some examples, device under test may be a personal computer 144 running MacOS, which may be the same as MacOS running on tester device 402. It should be understood that these are merely examples, but the same or different operating system may be running on tester device 402 and device under test 430.

In some examples, IDE 404 presents a user interface 405 on a display of the tester device 402. The user interface 405 can include a program code editor 406, displaying the source code of a program (e.g., an application). For debugging, IDE 404 can provide control over the execution of a program being debugged, such as the application process 432, which can be an executing instance of the program code shown in the program code editor 406. IDE 404 can provide debugging tools including allowing a user of the IDE 404 to set break points at particular lines or locations in the program code in program code editor 406 of the application process 432. Execution of the application process 432 can pause when the program code line at the breakpoint is about to be executed on the device under test 430, at which point the user can examine or change the values of program variables (e.g., shown in variables view window 408 of a debugging window 410), continue execution in a step-by-step mode, cause execution to resume until the next breakpoint, and so on. Although the above description focuses on use of the IDE 404 to debug applications 432 that execute on a different device or computer system (i.e., device under test 430) than the IDE 404, the IDE 404 can also be used to debug programs that execute on the tester device 402.

Additionally, IDE 404 can execute software (e.g., iOS Software Development Kit) to enable building, installing and running applications, such as application process 432, for testing on a device under test 430. In some examples, the user interface 405 can enable a user to simulate various device conditions for the device under test without having to create the various device conditions. For example, the user interface 405 can include a simulation window 420 with options to simulate device conditions such as network connection conditions or thermal conditions, among other possible conditions. The options can include one or more profiles for each of the conditions. Profiles can be included that may be unique for a specific device under test (e.g., for a specific hardware, for a specific generation of hardware, for a specific version of software, etc.). Profiles for the network connection conditions can include, for example, "3G, Average Case", "3G, Good Connectivity", "3G, Lossy Network", "Cable Model", "DSL", "Edge, Average Case", "Edge, Good Connectivity", "Edge, Lossy Network", "Wifi, Average Case", "Wifi, Good Connectivity", "Wifi, Lossy Network", among other possibilities. By building the application with one of the selected network connection profiles, installing the application, and running the application (e.g., application process 432) on device under test 430, the user can simulate the application as it would operate under simulated network conditions for the baseband chip (e.g., corresponding to baseband circuitry 316) or RF chip (e.g., corresponding to other RF circuitry 318) included among the various hardware components 460 of the device under test 430. For example, each of these conditions can result in changes in various parameters such as transmit power of an antenna, data transfer rates, etc. This simulation can simplify the testing process without having to spend the effort and cost to simulate these network conditions. As a result of the simulation, application process 432 can also receive a notification (e.g., a flag or state from one of hardware components 460, such as a CPU or baseband or other RF circuitry). The receipt of the notification can allow the developer to test the operation of the application to receiving this notification relating to the network state.

Similarly, profiles for thermal conditions can include, for example, "Normal", "Fair", "Severe", and "Critical", among other possibilities. By building the application with one of the selected thermal profiles, installing the application, and running the application (e.g., application process 432) on device under test 430, the user can simulate the application as it would operate under simulated thermal conditions, which under thermal management by thermal manager 440 (e.g., corresponding to thermal manager 304), may impact the power consumption and/or heat generation associated with various hardware components 460 of the device under test 430. For example, each of these conditions can result in changes in various parameters of the hardware components such as transmit power of one or more antenna, CPU or GPU clock speed, supply voltages, intensity of a light source, etc. This simulation can simplify the testing process without having to spend the effort and cost to simulate these thermal conditions, and without risking damage to device under test or a tester handling the device under test. The profiles for the thermal conditions can be stored, for example, in thermal manager, and thermal manager can simulate the thermal condition based on commands received from the tester device 402 to perform the simulation process. In some examples, the profile can be selected as part of the build after selecting the thermal condition in the simulation window 420 of IDE 404. As a result of the simulation, application process 432 can also receive a notification (e.g., a flag or state from a thermal manager 440 or from another of hardware components 460). The receipt of the notification can allow the developer to test the operation of the application receiving this notification relating to the thermal state.

Note that one or more of the functions described herein, including the simulation (building, installing, running and debugging of an application) by a tester device (e.g., tester device 402) and/or the thermal management processes of a thermal manager of a device under test (e.g., device under test 430 including thermal manager 440), can be performed by firmware stored in memory (e.g., in the tester device 402 and/or in the device under test 430) and executed by one or more processors (e.g., in the tester device 402 or in the device under test 430). The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 5:
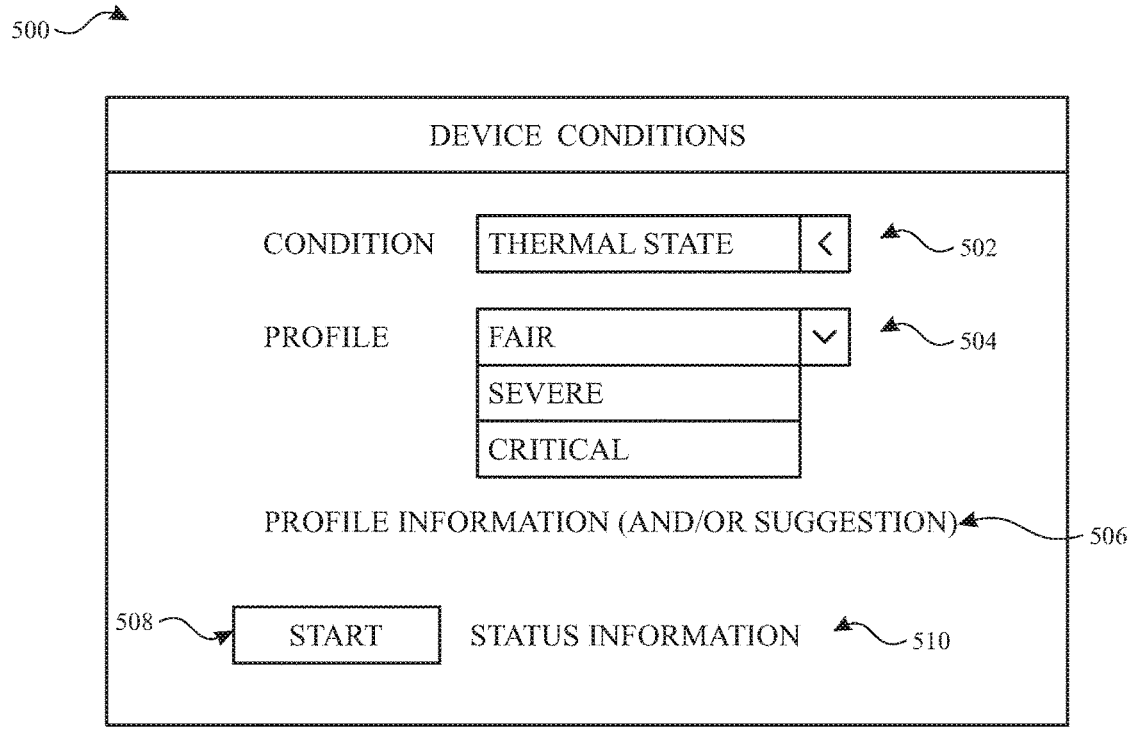
FIG. 5 illustrates an example graphical user interface for simulating device conditions according to examples of the disclosure.

FIG. 5 illustrates an example graphical user interface 500 for simulating device conditions according to examples of the disclosure. Graphical user interface 500 can be displayed, for example, in simulation window 420. Graphical user interface 500 can include a condition menu 502 to select a device condition to simulate. The conditions can include network conditions and thermal conditions, among other possibilities. In some examples, multiple conditions can be simulated concurrently (e.g., a thermal condition and a network condition). Graphical user interface 500 can include a profile menu 504 to select a profile for the selected condition from menu 502. The profile menu 504 can be populated with profiles corresponding to the selected condition. As shown in FIG. 5, for the selected "Thermal State" condition, profile menu can display profiles including "Fair", "Severe" and "Critical", among other possibilities. Additionally, information 506 can be provided in the graphical user interface (e.g., in proximity to the menus, such as below profile menu 504) for users to understand the meaning of a selected state and/or to provide suggestions for application developers to adjust operation for the application under the thermal condition. For example, for the "Fair" thermal profile, information 506 can explain that the system (device under test) behaves as though under slightly elevated thermal state (relative to a normal temperature state). For the "Severe" thermal profile, information 506 can explain that the system behaves as though under a high thermal state, and that in this state the application should reduce usage of the CPU, GPU and other IO (such as network or Bluetooth). For the "Critical" thermal profile, information 506 can explain that the system behaves as though there is significant thermal impact, and that in this state, the application should reduce usage of CPU, GPU and other I/O to minimal levels for user interactions.

Graphical user interface 500 can also include a button 508 (or other control affordance) to begin simulation of the selected condition and profile. In some examples, button 508 can include text to indicate its functionality when selected. Prior to beginning simulation, button 508 can read "Start" and actuating button 508 can build the application with the simulated device condition and profile. During the simulation, button 508 can read "Stop" and actuating button 508 can stop the simulation and optionally return the device under test to normal conditions. Graphical user interface 500 can also include status information 510. Status information 510 can be provided in the graphical user interface (e.g., in proximity to button 508, such as to the right of button 508) for users to understand the status. For example, status information 510 can indicate whether the simulated condition is active once the application is built and running on the device under test (nor not). The status information 510 can also indicate, after actuating button 508 to start the simulation, that the simulation is being set up (e.g., building the application, loading the application, etc.).

Figure 6:
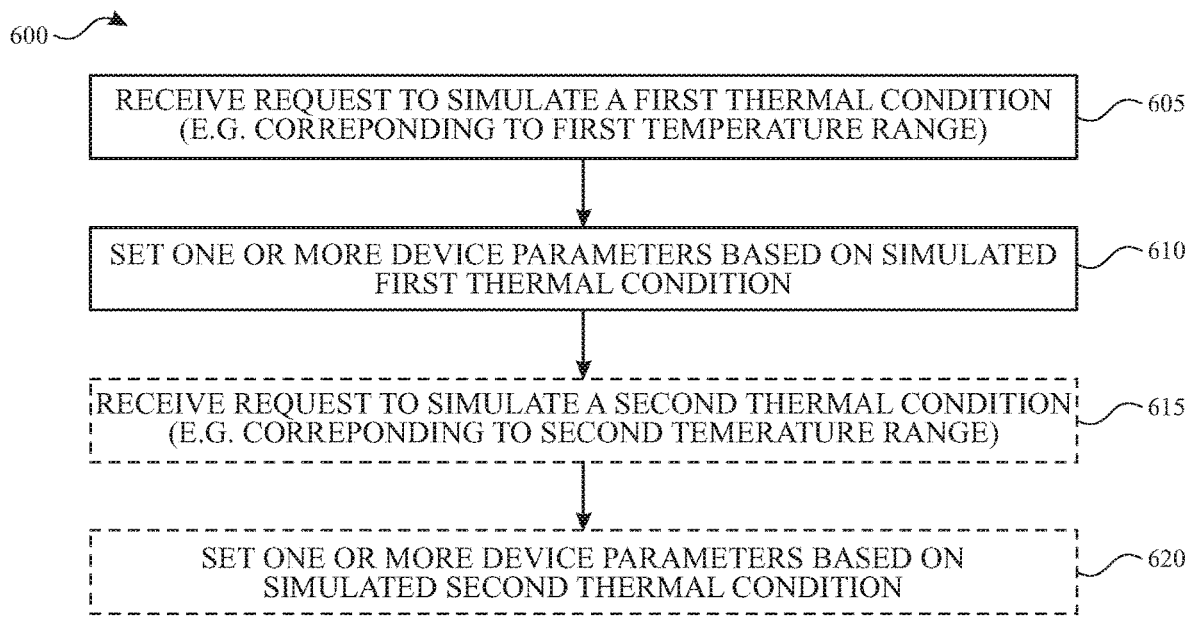
FIG. 6 illustrates process for simulating one or more thermal conditions according to some examples of the disclosure.

FIG. 6 illustrates process 600 for simulating one or more thermal conditions according to some examples of the disclosure. At 605, a system (e.g., device under test) can receive a request to simulate a first thermal condition. In some examples, the request can correspond to the simulation of a thermal condition (e.g., according to a Fair, Severe or Critical thermal profile) initiated in an IDE of a tester device (e.g., building the application along with a selected thermal profile). At 610, in response to receiving the request to simulate the first thermal condition, the system can set one or more parameters based on the simulated first thermal condition. In some examples, setting the one or more parameters can be performed by the thermal manager (e.g., corresponding to thermal manager 304, 440).

Setting the one or more parameters based on the simulated first thermal condition can include setting the one or more parameters based on a simulated profile including first simulated temperature measurements for one or more temperature sensors. In some examples, the actual temperature measurements of the temperature sensors can be ignored by thermal manager during the simulation. In some examples, the actual temperature measurements of the temperature sensors can be monitored during simulation to prevent damage to the system when actual temperatures diverge from simulated thermal conditions. As described in more detail below, setting the one or more parameters can include changing operating parameters or states of various hardware components of the system.

In some examples, profiles can define simulated temperature measurements for the one or more sensors for the device under test. As a result, profiles can simplify the development process for an application developer by allowing the IDE to handle simulating temperatures without the developer having to manually define a simulated temperature for each of the temperature sensors (e.g., by selecting a profile from a menu in IDE 404). For example, different devices may have different numbers of temperature sensors, different types of temperature sensors and/or different locations for temperature sensors, which are simulation considerations that can handled by the profiles in the IDE, rather than manually by the developer.

In some examples, a given profile can define the same simulated temperature measurement for each of the sensors (e.g., simulated temperature $T_1$ for temperature sensors $S_1$-$S_N$) while simulating the given profile. In some examples, the profile can define different simulated temperature measurements for some or all of the temperature sensors (e.g., a simulated temperature $T_1$ for a temperature sensor $S_1$, a different temperature $T_2$ for a different temperature sensor $S_2$, etc.). For example, a simulated temperature in or proximate to a CPU integrated circuit can be different than a simulated temperature for a temperature sensor in or proximate to a baseband chip. In some examples, the simulated temperature measurement in the profile for each temperature sensor can be set within a range of temperatures corresponding to the first thermal condition. For example, a given profile may define an upper temperature threshold ($T_{max}$) and a lower temperature threshold ($T_{min}$), and the simulated temperature can be set in between (e.g., $T_{min}<T_{sim}<T_{max}$). In some examples, the upper and lower temperature threshold can define the boundaries between two profiles. For example, $T_{max}$ for the Fair profile can be the same as $T_{min}$ for the Severe profile. In some examples, the upper and/or lower temperature thresholds can define the boundary of a profile, without the boundary corresponding to another of the profiles (e.g., there can be a gap between $T_{max}$ for the Fair profile and $T_{min}$ for the Severe profile). In some examples, the range of temperatures corresponding to the first thermal condition can refer to one range of temperatures applicable to simulated temperature measurements of all of the temperature sensors (e.g., one $T_{min}$ and one $T_{max}$ parameter for the profile for all temperature sensors). In some examples, the range of temperatures can refer to multiple ranges of temperatures (e.g., a different $T_{min}$ or $T_{max}$ parameter for the profile for some or all of temperature sensors). For example, the range of temperatures for simulated temperature of a first temperature sensor can be different from the range of temperatures for simulated temperature of a second temperature sensor (e.g., $T_{min\_1}$, $T_{max\_1}$ for $S_1$ in a given profile and $T_{min\_2}$, $T_{max\_2}$ for $S_2$ in the given profile, where $T_{min\_1}$ is different than $T_{min\_2}$ and/or $T_{max\_1}$ is different than $T_{max\_2}$).

Setting the one or more parameters can include, in some examples, setting an on/off state of one or more hardware components. For example, under certain thermal conditions, one or more hardware components can be disabled (turned off) or enabled (turned on). For example, a cooling fan can turn on under certain thermal conditions (e.g., when temperatures increase above a threshold, such as in a severe or critical thermal state) or turned off under certain thermal conditions (e.g., when temperatures decrease below a threshold, such as in the fair or normal thermal states). In some examples, one or more CPUs or GPUs (e.g., corresponding to CPUs 312 or GPUs 314) can be powered off under certain thermal conditions (e.g., in a severe or critical thermal state) and can be powered on under certain thermal conditions (e.g., in the fair or normal thermal states). Likewise, other hardware systems including the touch screen, baseband or other RF circuitry, charger, speaker, haptic device, etc., can be disabled or enabled under certain thermal conditions. As a general principle, relatively power hungry and less critical hardware components can be powered off first as thermal conditions worsen.

In some examples, setting the one or more parameters can include changing a power consumption level of one or more hardware components without turning the components off. For example, one or more CPUs or GPUs can reduce their clock speeds to reduce power consumption as thermal conditions worsen. In some examples, the transmit power of one or more antennas corresponding to the baseband (e.g., LTE, WCDMA, etc.) or other RF (WiFi, Bluetooth, etc.) circuitry can be reduced as thermal conditions worsen. In some examples, supply voltages of one or more hardware components can be reduced as thermal conditions worsen. In some examples, intensity of a light source and/or a display refresh rate of a touch screen can be reduced as thermal conditions worsen. In some examples, the volume of one or more speakers can be reduced as thermal conditions worsen. In some examples, haptic feedback levels can be reduced as thermal conditions worsen.

It should be understood that the above are examples of one or more parameters that can be set for one or more hardware components, but that additional parameters for other hardware components can be set under the various thermal conditions to reduce power consumption by the various hardware components as thermal conditions worsen.

Under simulation, different thermal profiles can correspond to different sets of parameters. For example, at 615, the system (e.g., device under test) can receive a request to simulate a second thermal condition, different from the first thermal condition. The request can correspond to the simulation of a different thermal condition initiated in an IDE of a tester device (e.g., building the application along with a different selected thermal profile). At 620, in response to receiving the request to simulate the second thermal condition, the system (e.g., thermal manager of device under test) can set one or more parameters based on the simulated second thermal condition. Some or all of the one or more parameters set based on the second thermal conditions can be different from the one or more parameters set based on the first thermal conditions. For example, as thermal conditions worsen, additional components can be disabled (powered off) or can be constrained or further constrained (e.g., reduced voltage, power, speed, etc.)

Figure 7:
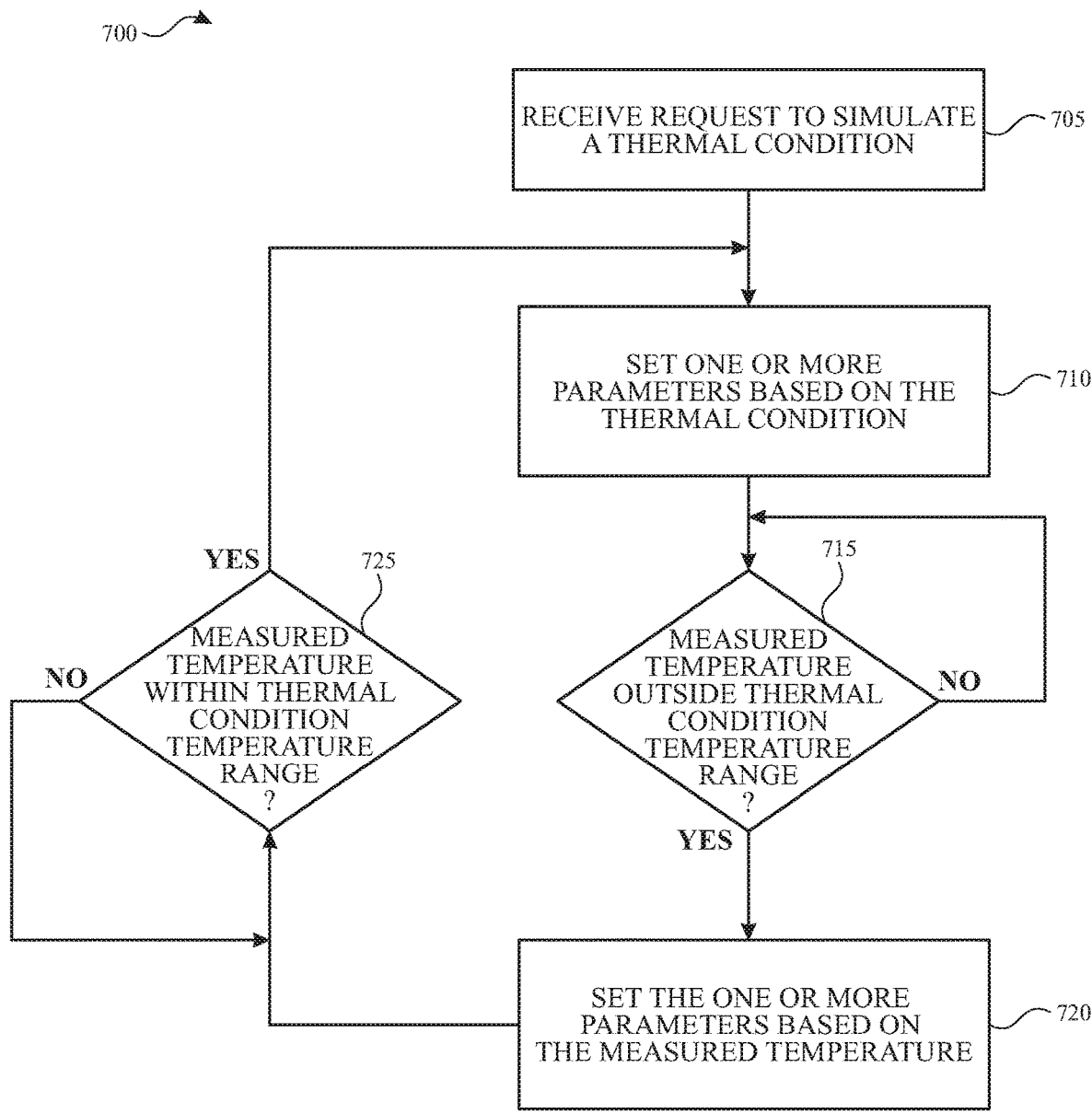
FIG. 7 illustrates process for simulating one or more thermal conditions with a safety mechanism according to some examples of the disclosure.

As described above, in some examples, temperature measurements of the one or more temperature sensors can continue to be monitored while simulating thermal conditions to prevent damage to device. FIG. 7 illustrates process 700 for simulating one or more thermal conditions with a safety mechanism according to some examples of the disclosure. At 705, a system (e.g., device under test) can receive a request to simulate a thermal condition. In some examples, the request can correspond to the simulation of a thermal condition initiated in an IDE of a tester device (e.g., building the application along with a selected thermal profile). At 710, in response to receiving the request to simulate the thermal condition, the system can set one or more parameters based on the simulated thermal condition (e.g., as described above with respect to process 600). In some examples, setting the one or more parameters can be performed by the thermal manager (e.g., corresponding to thermal manager 304, 440).

The system can determine, at 715, whether the actual temperature measurements of one or more temperature sensors are within or outside a temperature range (or one or more temperature ranges assuming different temperature ranges for different temperature sensors) for the simulated thermal condition. When the actual temperature measurement(s) are within the temperature range(s), the simulation can continue with the one or more parameters set based on the simulated thermal condition (and continue with monitoring the actual temperature measurements). When the actual temperature measurement(s) are outside the temperature range(s), the one or more parameters can be set, at 720, based on the actual temperature measurements from the temperature sensors rather than based on the simulated thermal condition (e.g., in a closed-loop manner). In some examples, transitioning from the simulated temperatures to actual temperatures for setting the one or more parameters can terminate the simulation (and the user can, optionally, be notified in the simulation window 420 or other user interface if tester device 402). In some examples, the simulation can be paused (and the user can, optionally, be notified in the simulation window 420 or other user interface that the simulation has been paused). At 725, the system can determine whether the actual temperature measurement(s) are within or outside the temperature range(s) for the simulated thermal condition. When the actual temperature measurement(s) are outside the temperature range(s), the one or more parameters based on the actual temperature measurements can continue to be used for thermal management. When the actual temperature measurement(s) are within the temperature range(s), the one or more parameters can be set, at 720, based on the simulated temperature measurements of the simulated thermal condition rather than based on the actual temperature measurements from the temperature sensors (returning to 710). In some examples, the simulation can effectively be resumed (and the user can, optionally, be notified in the simulation window 420 or other user interface that the simulation has resumed after the pause). In some examples, the determination at 725 can be triggered manually, rather than automatically, based on a request from the user (e.g., at the tester device) to resume the paused or ended simulation.

Figure 8:
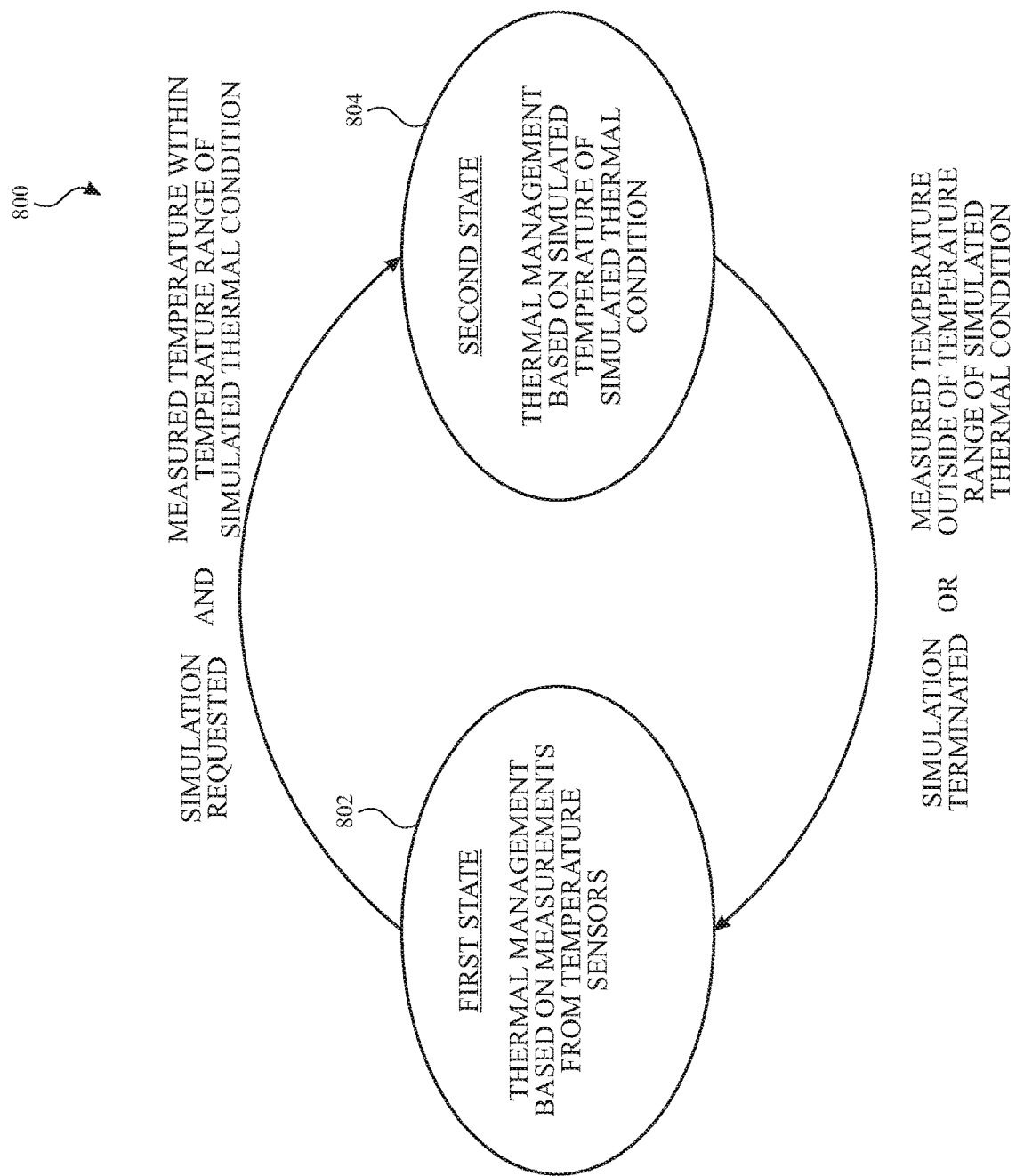
FIG. 8 illustrates a state diagram illustrative of the two modes of operation for thermal management of a system according to examples of the disclosure.

FIG. 8 illustrates a state diagram illustrative of the two modes of operation for thermal management of a system according to examples of the disclosure. State diagram 800 can generally correspond to the operation of process 700. A first state 802 can correspond to a closed-loop state in which thermal management (including setting one or more parameters) can be based on actual temperatures measured by one or more temperature sensors. A second state 804 can correspond to an open-loop state in which thermal management can be based on simulated temperatures of a thermal condition rather than based on the temperature sensors. The thermal manager (e.g., thermal manager 304, 440) can transition from the first state 802 to the second state 804 when a simulation is requested (e.g., initial simulation request, or a resumption of a paused simulation) and while the measured temperature of the one or more temperature sensors remain within the temperature range(s) corresponding to the simulated thermal condition. The thermal manager (e.g., thermal manager 304, 440) can transition from the second state 804 to the first state 802 when the simulation is terminated (e.g., a termination requested by the user via the simulation window 420) or while the measured temperature of the one or more temperature sensors exits the temperature range(s) corresponding to the simulated thermal condition.

It should be understood that although temperature ranges are disclosed above, it is possible that an upper threshold can be used rather than a range. For example, using temperature ranges the device can pause simulation while in Severe thermal condition when the device either cools sufficiently to correspond with a Fair thermal condition or heats sufficiently to correspond to a Critical thermal condition. This may provide a clearer picture to the application developer of the true behavior. However, cooling of the device does not pose a risk of damaging the device that unexpected heating of the device can while closed-loop thermal management is disabled. Thus, in some examples, simulation may be paused when the actual temperature exceeds a threshold (e.g., maximum of the temperature range for the simulated condition), but not paused when the actual temperature falls below a threshold (e.g., minimum of the temperature range for the simulated condition).

Additionally, it should be understood that the transitions between states 802 and 804 (or pausing/resuming simulation) may use different temperature thresholds or ranges. For example, hysteresis may be applied to avoid high frequency transitions when operating the device near a threshold or near and end of a temperature range. For example, the temperature threshold to resume a simulation may be different than the temperature threshold to pause a simulation. In some examples, the threshold to pause the simulation can be the upper bound ($T_{max}$) or lower bound ($T_{min}$) of the temperature range and the threshold to resume the simulation can be within the temperature range (e.g., greater than the lower bound or less than the upper bound).

It should be understood that in addition to monitoring the impacts of a simulated thermal condition on the device under test, the impacts can be viewed within the application/device under test, and also across other devices (e.g., peripheral devices 470 in communication with device under test 430). For example, when the device under test corresponds to a portable or wearable device including a media player application (e.g., iPhone, iPod, Apple Watch, etc.), the impact of setting parameters for RF circuitry according to the thermal condition can also impact the sound quality of media playback on a paired secondary device including a speaker (e.g., AirPods, HomePod, headphones, etc.). The developer of a media playback application can use the sound quality on the peripheral device during the simulation to determine whether to make adjustments to resource usage and maintain desired performance from the application. For example, a different audio or video encoding scheme could be used under worse thermal conditions to maintain playback of a minimum level of quality rather than choppy playback at a higher level of quality. As another example, the device under test can be a media set top box (e.g., AppleTV) in communication with a television or another display. The performance of the application running on the media set top box can be evaluated using the television or other display. As a further example, a device under test can be a mobile telephone (e.g., iPhone) and a paired wearable device (e.g., Apple Watch) can be used to evaluate the performance of the application running on the mobile phone. It should be understood that these are examples, and other devices can be used in evaluating the performance of an application under test under simulated thermal conditions.

Additionally, it should be understood that in some instances the performance can be evaluated with multiple devices (e.g., device under test 400 and one or more additional devices under test 480) simulating the same and/or different thermal conditions. For example, the IDE may enable more than one of the above described devices to simulate the same or different thermal conditions. These simulations can be used to enable to an application developer to evaluate the performance of application under various real-world thermal conditions and to evaluate the impacts on an application that may be running simultaneously on multiple devices.

Therefore, according to the above, some examples of the disclosure are directed to a method. The method can comprise receiving a request to simulate a first thermal condition for an electronic device under test; and in response to the request to simulate the first thermal condition, setting parameters for one or more hardware components of the electronic device based on the first thermal condition. Additionally or alternatively, in some examples, the method can further comprise: receiving a request to simulate a second thermal condition, different from the first thermal condition, for the electronic device; and in response to the request to simulate the second thermal condition, setting parameters for the one or more hardware components of the electronic device based on the second thermal condition. The parameters for the one or more hardware components of the electronic device based on the second thermal condition can be different from the parameters for the one or more hardware components of the electronic device based on the first thermal condition. Additionally or alternatively, in some examples, the first thermal condition can correspond to a first range of temperatures of one or more temperature sensors of the electronic device and the second thermal condition can correspond to a second range of temperatures of the one or more temperature sensors of the electronic device different from the first range of temperatures. Additionally or alternatively, in some examples, the one or more hardware components of the electronic device can comprise a central processing unit (CPU), a graphics processing unit (GPU), a baseband processing circuit, a radiofrequency processing circuit, a display, an audio speaker, a haptic feedback device, or a charger circuit. Additionally or alternatively, in some examples, the parameters of the one or more hardware components can comprise an on-or-off state parameter, a clock-speed parameter, a power supply voltage parameter, a transmit power parameter, a data-rate parameter, or a light intensity parameter. Additionally or alternatively, in some examples, the method can further comprise: in response to the request to simulate the first thermal condition, notifying an application running on the electronic device of the thermal condition. Additionally or alternatively, in some examples, setting the parameters of the one or more hardware components based on the simulated thermal condition can comprise ignoring temperatures measured by one or more temperature sensors of the electronic device.

Some examples of the disclosure are directed to a non-transitory computer readable storage medium. The non-transitory computer readable storage medium can store instructions (e.g., one or more programs), which when executed by one or more processors of an electronic device, cause the electronic device to perform any of the above methods. Some examples of the disclosure are directed to an electronic device. The electronic device can comprise one or more processors; memory (e.g., a non-transitory computer readable storage medium); and one or more programs. The one or more programs can be stored in the memory and can be configured to be executed by the one or more processors. The one or more programs can include instructions for performing any of the above methods.

Some examples of the disclosure are directed to an electronic device. The electronic device can comprise: one or more temperature sensors; one or more hardware components; and thermal management circuitry programmed to: in a first mode of operation, set parameters of the one or more hardware components based on the one or more temperature sensors; and in a second mode of operation, set the parameters of the one or more hardware components based on a simulated thermal condition. Additionally or alternatively, in some examples, setting the parameters of the one or more hardware components based on the simulated thermal condition can comprise ignoring temperatures measured by the one or more temperature sensors. Additionally or alternatively, in some examples, the one or more hardware components can comprise a central processing unit (CPU), a graphics processing unit (GPU), a baseband processing circuit, a radiofrequency processing circuit, a display, an audio speaker, a haptic feedback device, or a charger circuit. Additionally or alternatively, in some examples, the parameters of the one or more hardware components can comprise an on-or-off state parameter, a clock speed parameter, a power supply voltage parameter, a transmit power parameter, a data-rate parameter or a light intensity parameter. Additionally or alternatively, in some examples, the simulated thermal condition can correspond to one of a first thermal condition corresponding to a first range of temperatures of the one or more temperature sensors, a second thermal condition corresponding to a second range of temperatures of the one or more temperature sensors, and a third thermal condition corresponding to a third range of temperatures of the one or more temperature sensors. The first range of temperatures, second range of temperatures, and third range of temperatures can be different from one another.

Some examples of the disclosure are directed to a method. The method can comprise: in a first mode of operation, setting parameters of the hardware components of an electronic device under test based on one or more temperature sensors; and in a second mode of operation, setting the parameters of the one or more hardware components based on a simulated thermal condition. Additionally or alternatively, in some examples, setting the parameters of the one or more hardware components based on the simulated thermal condition can comprise ignoring temperatures measured by the one or more temperature sensors. Additionally or alternatively, in some examples, the one or more hardware components can comprise a central processing unit (CPU), a graphics processing unit (GPU), a baseband processing circuit, a radiofrequency processing circuit, a display, an audio speaker, a haptic feedback device, or a charger circuit. Additionally or alternatively, in some examples, the parameters of the one or more hardware components can comprise an on-or-off state parameter, a clock speed parameter, a power supply voltage parameter, a transmit power parameter, a data-rate parameter or a light intensity parameter. Additionally or alternatively, in some examples, the simulated thermal condition can correspond to one of a first thermal condition corresponding to a first range of temperatures of the one or more temperature sensors, a second thermal condition corresponding to a second range of temperatures of the one or more temperature sensors, and a third thermal condition corresponding to a third range of temperatures of the one or more temperature sensors. The first range of temperatures, second range of temperatures, and third range of temperatures can be different from one another.

Some examples of the disclosure are directed to a non-transitory computer readable storage medium. The non-transitory computer readable storage medium can store instructions (e.g., one or more programs), which when executed by one or more processors of an electronic device, cause the electronic device to perform any of the above methods.

Some examples of the disclosure are directed to an electronic device. The electronic device can comprise: one or more temperature sensors; one or more hardware components; and thermal management circuitry programmed to: in a first mode of operation, set parameters of the one or more hardware components based on temperatures measured by the one or more temperature sensors; and in a second mode of operation, set the parameters of the one or more hardware components based on a simulated thermal condition rather the temperatures measured by the one or more temperature sensors while the temperatures measured by the one or more temperature sensors are less than a first temperature threshold corresponding to an upper temperature range of the simulated thermal condition. Additionally or alternatively, in some examples, the thermal management circuitry can be further programmed to: in the second mode of operation, set the parameters of the one or more hardware components in accordance with the temperatures measured by the one or more temperature sensors while the temperatures measured by the one or more temperature sensors are greater than a second temperature threshold corresponding to the upper temperature range of the simulated thermal condition. Additionally or alternatively, in some examples, the first threshold and the second threshold can be the same. Additionally or alternatively, in some examples, the first threshold and the second threshold can be different.

Some examples of the disclosure are directed to a method. The method can comprise: in a first mode of operation, setting parameters of one or more hardware components of an electronic device under test based on temperatures measured by one or more temperature sensors; and in a second inode of operation, setting the parameters of the one or more hardware components based on a simulated thermal condition rather the temperatures measured by the one or temperature sensors while the temperatures measured by the one or more temperature sensors are less than a first temperature threshold corresponding to an upper temperature range of the simulated thermal condition. Additionally or alternatively, in some examples, the method can further comprise: in the second mode of operation, setting the parameters of the one or more hardware components in accordance with the temperatures measured by the one or more temperature sensors while the temperatures measured by the one or more temperature sensors are greater than a second temperature threshold corresponding to the upper temperature range of the simulated thermal condition. Additionally or alternatively, in some examples, the first threshold and the second threshold can be the same. Additionally or alternatively, in some examples, the first threshold and the second threshold can be different. Some examples of the disclosure are directed to a non-transitory computer readable storage medium. The non-transitory computer readable storage medium can store instructions (e.g., one or more programs), which when executed by one or more processors of an electronic device, cause the electronic device to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
at a first electronic device in communication with a second electronic device under test:
receiving a request to simulate a first thermal condition for the second electronic device under test;
in response to receiving the request to simulate the first thermal condition, simulating the first thermal condition, wherein simulating the first thermal condition comprises setting parameters for one or more hardware components of the second electronic device under test based on the first thermal condition;
receiving a request to simulate a second thermal condition, different from the first thermal condition, for the second electronic device under test; and
in response to the request to simulate the second thermal condition, setting parameters for the one or more hardware components of the second electronic device under test based on the second thermal condition, wherein the parameters for the one or more hardware components of the second electronic device under test based on the second thermal condition are different from the parameters for the one or more hardware components of the second electronic device under test based on the first thermal condition.

2. The method of claim 1, wherein the first thermal condition corresponds to a first range of temperatures of one or more temperature sensors of the second electronic device under test and the second thermal condition corresponds to a second range of temperatures of the one or more temperature sensors of the second electronic device under test different from the first range of temperatures.

3. The method of claim 1, wherein the one or more hardware components of the second electronic device under test comprises a central processing unit (CPU), a graphics processing unit (GPU), a baseband processing circuit, a radiofrequency processing circuit, a display, an audio speaker, a haptic feedback device, a charger circuit, or a combination thereof.

4. The method of claim 1, wherein the parameters of the one or more hardware components of the second electronic device under test comprise an on-or-off state parameter, a clock-speed parameter, a power supply voltage parameter, a transmit power parameter, a data-rate parameter, a light intensity parameter, or a combination thereof.

5. The method of claim 1, further comprising:
in response to the request to simulate the first thermal condition, notifying an application running on the second electronic device under test of the first thermal condition.

6. The method of claim 1, wherein setting parameters of the one or more hardware components based on the simulated first thermal condition comprises ignoring temperatures measured by one or more temperature sensors of the second electronic device under test.

7. A first electronic device, comprising:
one or more processors;
memory; and
one or more programs, wherein the one or more programs are stored in the memory and configured to be executed by the one or more processors of the first electronic device, wherein the first electronic device is in communication with a second electronic device under test, and wherein the one or more programs include instructions for causing the first electronic device to perform a method comprising:
receiving a request to simulate a first thermal condition for a second electronic device under test;
in response to receiving the request to simulate the first thermal condition, simulating the first thermal condition, wherein simulating the first thermal condition comprises setting parameters for one or more hardware components of the second electronic device under test based on the first thermal condition;
receiving a request to simulate a second thermal condition, different from the first thermal condition, for the second electronic device under test; and
in response to the request to simulate the second thermal condition, setting parameters for the one or more hardware components of the second electronic device under test based on the second thermal condition, wherein the parameters for the one or more hardware components of the second electronic device under test based on the second thermal condition are different from the parameters for the one or more hardware components of the second electronic device under test based on the first thermal condition.

8. The first electronic device of claim 7, wherein the first thermal condition corresponds to a first range of temperatures of one or more temperature sensors of the second electronic device under test and the second thermal condition corresponds to a second range of temperatures of the one or more temperature sensors of the second electronic device under test different from the first range of temperatures.

9. The first electronic device of claim 7, wherein the one or more hardware components of the second electronic device under test comprises a central processing unit (CPU), a graphics processing unit (GPU), a baseband processing circuit, a radiofrequency processing circuit, a display, an audio speaker, a haptic feedback device, a charger circuit, or a combination thereof.

10. The first electronic device of claim 7, wherein the parameters of the one or more hardware components comprise an on-or-off state parameter, a clock-speed parameter, a power supply voltage parameter, a transmit power parameter, a data-rate parameter, a light intensity parameter, or a combination thereof.

11. The first electronic device of claim 7, the method further comprising:
in response to the request to simulate the first thermal condition, notifying an application running on the second electronic device under test of the first thermal condition.

12. The first electronic device of claim 7, wherein setting parameters of the one or more hardware components based on the simulated first thermal condition comprises ignoring temperatures measured by one or more temperature sensors of the second electronic device under test.

13. A non-transitory computer readable storage medium storing one or more programs, the one or more programs comprising instructions, which when executed by one or more processors of a first electronic device that is in communication with a second electronic device under test, cause the first electronic device to perform a method comprising:
receiving a request to simulate a first thermal condition for the second electronic device under test;
in response to the request to simulate the first thermal condition, simulating the first thermal condition, wherein simulating the first thermal condition comprises setting parameters for one or more hardware components of the second electronic device under test based on the first thermal condition;
receiving a request to simulate a second thermal condition, different from the first thermal condition, for the second electronic device under test and
in response to the request to simulate the second thermal condition, setting parameters for the one or more hardware components of the second electronic device under test based on the second thermal condition, wherein the parameters for the one or more hardware components of the second electronic device under test based on the second thermal condition are different from the parameters for the one or more hardware components of the second electronic device under test based on the first thermal condition.

14. The non-transitory computer readable storage medium of claim 11, wherein the first thermal condition corresponds to a first range of temperatures of one or more temperature sensors of the second electronic device under test and the second thermal condition corresponds to a second range of temperatures of the one or more temperature sensors of the second electronic device under test different from the first range of temperatures.

15. The non-transitory computer readable storage medium of claim 13, wherein the one or more hardware components of the second electronic device under test comprises a central processing unit (CPU), a graphics processing unit (GPU), a baseband processing circuit, a radiofrequency processing circuit, a display, an audio speaker, a haptic feedback device, a charger circuit, or a combination thereof.

16. The non-transitory computer readable storage medium of claim 13, wherein the parameters of the one or more hardware components comprise an on-or-off state parameter, a clock-speed parameter, a power supply voltage parameter, a transmit power parameter, a data-rate parameter, a light intensity parameter, or a combination thereof.

17. The non-transitory computer readable storage medium of claim 13, the method further comprising:
in response to the request to simulate the first thermal condition, notifying an application running on the second electronic device under test of the first thermal condition.

18. The non-transitory computer readable storage medium of claim 13, wherein setting the parameters of the one or more hardware components based on the simulated first thermal condition comprises ignoring temperatures measured by one or more temperature sensors of the second electronic device under test.

* * * * *

UNITED STATES PATENT AND TRADEMARK OFFICE
CERTIFICATE OF CORRECTION

| | | |
|---|---|---|
| PATENT NO. | : 11,965,927 B2 | Page 1 of 1 |
| APPLICATION NO. | : 16/562350 | |
| DATED | : April 23, 2024 | |
| INVENTOR(S) | : Jay Mayur Khandhar et al. | |

It is certified that error appears in the above-identified patent and that said Letters Patent is hereby corrected as shown below:

In the Claims

In Column 29, Line 31, Claim 13, please delete "test" and insert --test;--.
In Column 30, Line 5, Claim 14, please delete "claim 11," and insert --claim 13,--.

Signed and Sealed this
Thirtieth Day of September, 2025

John A. Squires
*Director of the United States Patent and Trademark Office*